United States Patent
Rothe et al.

(10) Patent No.: US 9,797,284 B2
(45) Date of Patent: Oct. 24, 2017

(54) EXHAUST-GAS AFTERTREATMENT DEVICE FOR AN INTERNAL COMBUSTION ENGINE, AND METHOD FOR HEATING AN EXHAUST-GAS AFTERTREATMENT DEVICE

(71) Applicant: MAN Truck & Bus AG, Munich (DE)

(72) Inventors: Dieter Rothe, Nürnberg (DE); Florian Lutz, Ansbach (DE)

(73) Assignee: MAN TRUCK & BUS AG, Munich (DE)

( * ) Notice: Subject to any disclaimer, the term of this patent is extended or adjusted under 35 U.S.C. 154(b) by 404 days.

(21) Appl. No.: 14/538,962

(22) Filed: Nov. 12, 2014

(65) Prior Publication Data
US 2015/0132205 A1 May 14, 2015

(30) Foreign Application Priority Data
Nov. 13, 2013 (DE) .................. 10 2013 018 920

(51) Int. Cl.
| | |
|---|---|
| *F01N 3/021* | (2006.01) |
| *F01N 3/10* | (2006.01) |
| *F01N 3/00* | (2006.01) |
| *F01N 3/20* | (2006.01) |
| *F01N 3/08* | (2006.01) |
| *B01D 53/04* | (2006.01) |

(Continued)

(52) U.S. Cl.
CPC ......... *F01N 3/005* (2013.01); *B01D 53/0438* (2013.01); *B01D 53/0446* (2013.01); *B01D 53/9481* (2013.01); *F01N 3/0807* (2013.01); *F01N 3/0828* (2013.01); *F01N 3/0878* (2013.01); *F01N 3/2006* (2013.01); *F01N 3/26* (2013.01); *F01N 13/08* (2013.01); *B01D 2253/104* (2013.01); *B01D 2253/106* (2013.01); *B01D 2253/108* (2013.01); *B01D 2253/1126* (2013.01); *B01D 2258/01* (2013.01); *F01N 2410/00* (2013.01); *F01N 2410/06* (2013.01);

(Continued)

(58) Field of Classification Search
CPC ............ B01D 53/0438; B01D 53/0446; B01D 53/9481; B01D 2253/104; B01D 2253/106; B01D 2253/108; B01D 2253/1126; B01D 2248/01; Y02T 10/20; F01N 13/08; F01N 3/005; F01N 3/0807; F01N 3/0828; F01N 3/0878; F01N 3/26; F01N 3/10; F01N 3/20; F01N 3/021; F01N 2410/00; F01N 2410/06; F01N 2510/063; F01N 2510/0682; F01N 2270/22; F01N 3/2006
USPC ...... 95/90, 117, 148; 96/121, 131, 134, 154; 55/385.3, DIG. 30; 60/299
See application file for complete search history.

(56) References Cited

U.S. PATENT DOCUMENTS

| | | | | |
|---|---|---|---|---|
| 5,303,547 A | * | 4/1994 | Mieville ............ | B01D 53/0454 422/173 |
| 7,407,534 B2 | * | 8/2008 | Choi .................... | B01D 53/944 123/518 |

(Continued)

FOREIGN PATENT DOCUMENTS

DE       198 00 654 A1    7/1999

*Primary Examiner* — Frank Lawrence
(74) *Attorney, Agent, or Firm* — Lucas & Mercanti, LLP

(57) ABSTRACT

An exhaust-gas aftertreatment device for an internal combustion engine, for use in a motor vehicle, includes an exhaust tract with at least one exhaust pipe and at least one exhaust-gas aftertreatment element. The exhaust-pipe internal wall and/or the at least one exhaust-gas aftertreatment element have/has a vapor-sorbing material forming at least one exhaust-tract-side sorption element.

22 Claims, 4 Drawing Sheets

(51) Int. Cl.
  *B01D 53/94* (2006.01)
  *F01N 3/26* (2006.01)
  *F01N 13/08* (2010.01)

(52) U.S. Cl.
  CPC  *F01N 2510/063* (2013.01); *F01N 2510/0682* (2013.01); *F01N 2570/22* (2013.01); *Y02T 10/20* (2013.01)

(56) References Cited

U.S. PATENT DOCUMENTS

| | | | |
|---|---|---|---|
| 7,442,346 B2* | 10/2008 | Ikeda | B01D 53/945 422/169 |
| 2003/0012707 A1* | 1/2003 | Yamamoto | B01D 53/9454 422/177 |
| 2004/0118387 A1* | 6/2004 | Lawrence | B01D 53/02 123/518 |
| 2004/0168509 A1* | 9/2004 | Takakura | F01N 3/0814 73/114.77 |
| 2012/0291431 A1* | 11/2012 | Bucknell | F01N 13/0097 60/602 |
| 2012/0304627 A1* | 12/2012 | Gonze | F01N 3/0814 60/286 |
| 2013/0269326 A1* | 10/2013 | Degen | F01N 3/0835 60/297 |
| 2015/0132188 A1* | 5/2015 | Howard | B01D 53/9445 422/115 |

* cited by examiner

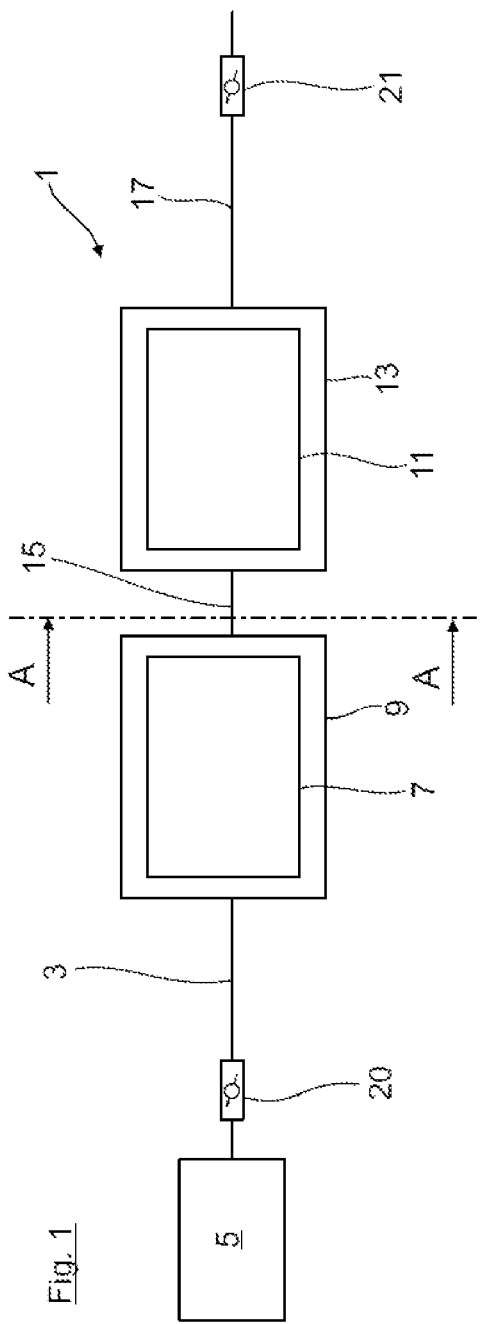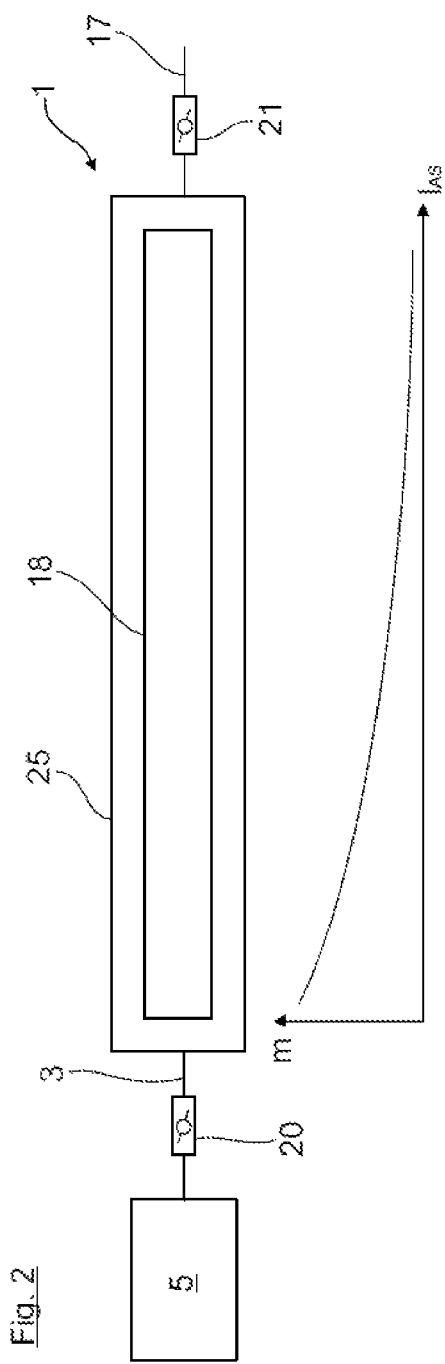

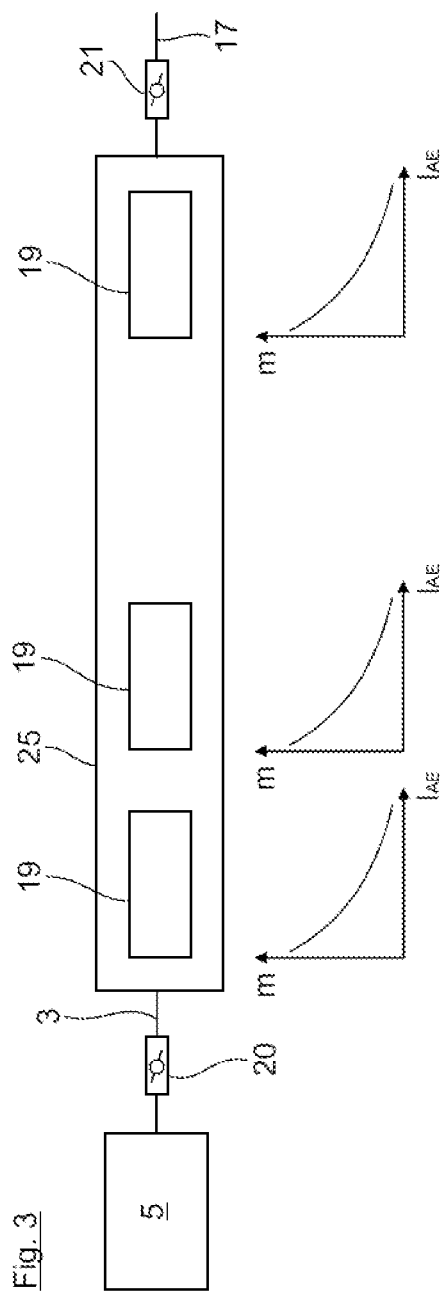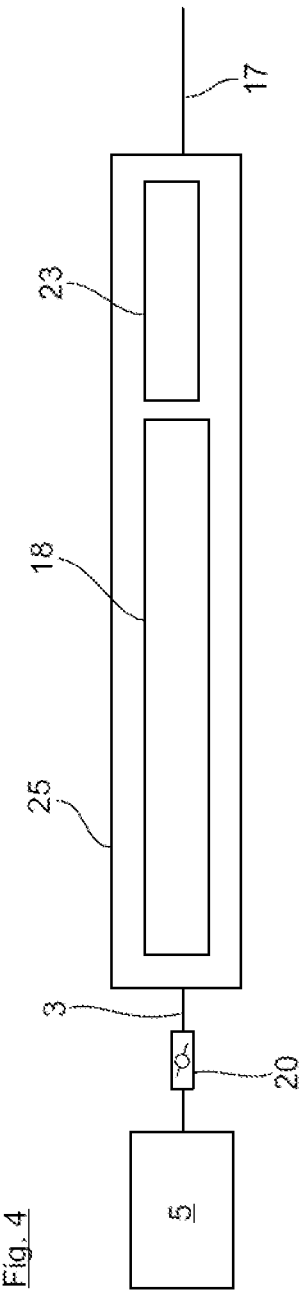

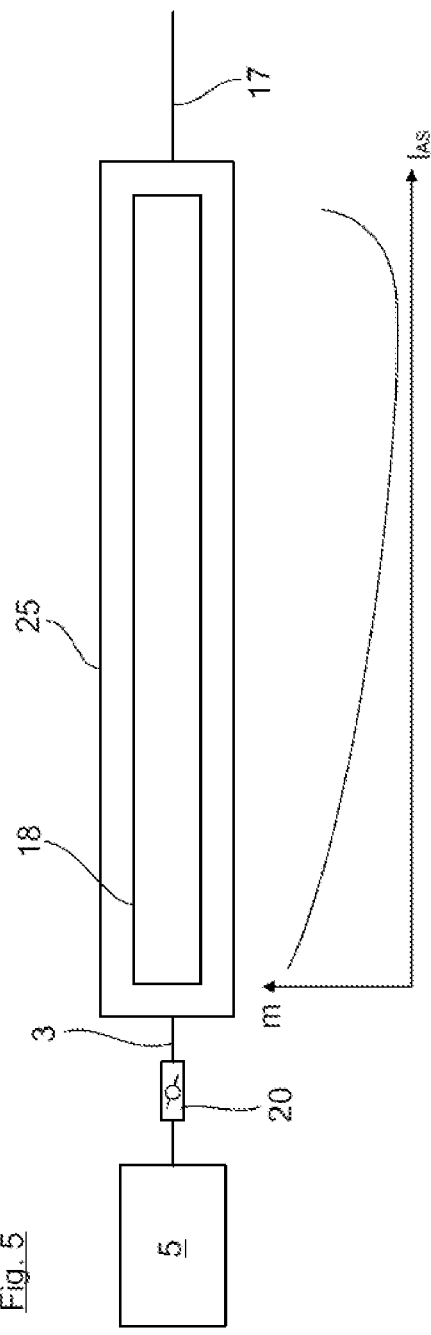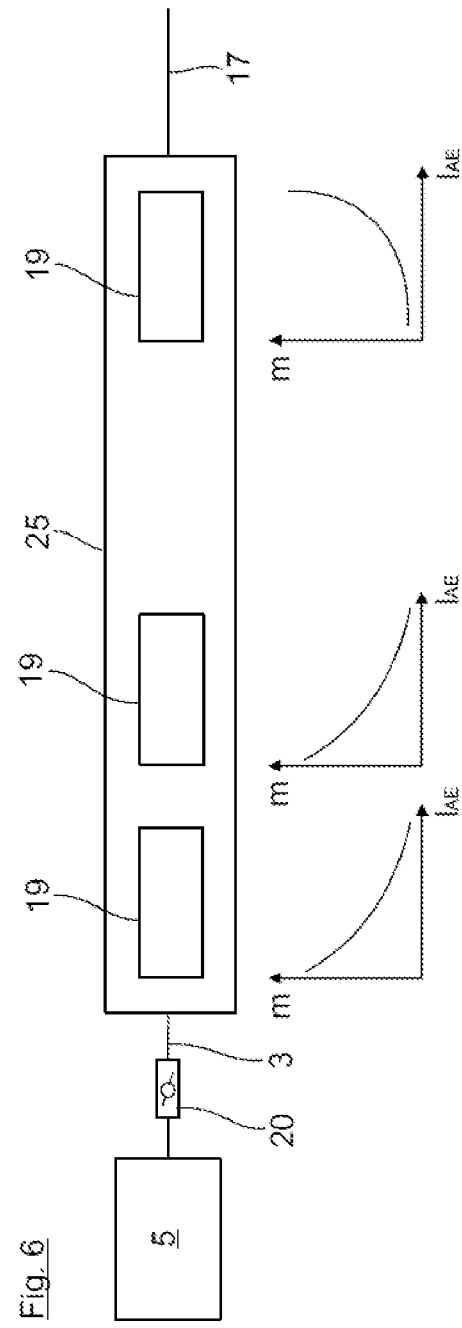

EXHAUST-GAS AFTERTREATMENT DEVICE FOR AN INTERNAL COMBUSTION ENGINE, AND METHOD FOR HEATING AN EXHAUST-GAS AFTERTREATMENT DEVICE

CROSS REFERENCE TO RELATED APPLICATION

This application claims the priority of DE 10 2013 018 920.9 filed Nov. 13, 2013, which is incorporated by reference herein.

BACKGROUND OF THE INVENTION

The invention relates to an exhaust-gas aftertreatment device for an internal combustion engine and to a method for heating an exhaust-gas aftertreatment device.

In modern exhaust-gas aftertreatment systems, it is conventional for multiple types of exhaust-gas aftertreatment elements, for example catalytic converters or particle filters, to be integrated into an exhaust tract and for a targeted reduction of individual pollutant types to be sought by the exhaust-gas aftertreatment elements. Some of the exhaust-gas aftertreatment elements however attain their full performance or their optimum working temperature only when the internal combustion engine has warmed up. For this reason, extensive measures are implemented which ensure rapid heating of the exhaust-gas aftertreatment elements in the cold-start phase of an internal combustion engine.

From DE 198 00 654 A1, for example, it is known for a first water trap, an electrically heatable honeycomb body, a honeycomb body with catalytically active coating and a second water trap to be arranged in series in the exhaust-gas flow direction in an exhaust tract for an internal combustion engine. The electrically heatable honeycomb body and the honeycomb body with catalytically active coating may in this case preferably form a structural unit, whereby the honeycomb body with catalytically active coating can be heated more quickly by the electrically heatable honeycomb body in the cold-start phase of the internal combustion engine. In this way, the reduction of the pollutants in the exhaust gas of the internal combustion engine is improved. The two water traps further ensure that the two honeycomb bodies are in a dry state and thus warm up particularly rapidly.

BRIEF SUMMARY OF THE INVENTION

It is an object of the invention to provide an exhaust-gas aftertreatment device for an internal combustion engine, in particular for use in a motor vehicle, and a method for heating an exhaust-gas aftertreatment device, by means of which exhaust-gas aftertreatment device and method it is possible for the reduction of the pollutant emissions, in particular in the cold-start phase of the internal combustion engine, to be achieved in a simple and functionally reliable manner with high effectiveness.

The invention relates to an exhaust-gas aftertreatment device for an internal combustion engine, in particular for use in a motor vehicle, having an exhaust tract with at least one exhaust pipe and at least one exhaust-gas aftertreatment element. According to the invention, the exhaust-pipe internal wall and/or the at least one exhaust-gas aftertreatment element have/has a vapour-sorbing material for the purpose of forming at least one exhaust-tract-side sorption element.

The adsorption and/or absorption of the vapour, in particular water vapour, originating for example from the exhaust gas of the internal combustion engine by the vapour-sorbing material lead(s) to condensation of the vapour, and thus to a release of heat energy.

The heat energy causes the sorption element formed by the exhaust-pipe internal wall and/or the at least one exhaust-gas aftertreatment element to be heated, such that, upon a start of the internal combustion engine, in particular upon a cold start of the internal combustion engine, the entire exhaust tract is heated more rapidly, and the at least one exhaust-gas aftertreatment element can attain its optimum operating temperature more quickly. In this way, the heating of the at least one exhaust-gas aftertreatment element is simplified considerably, because only the vapour-sorbing material has to be provided. Accordingly, it is for example possible to dispense with electrical lines and terminals for the supply of energy to an electric heating element. Since, furthermore, the exhaust-pipe internal wall and/or the at least one exhaust-gas aftertreatment element form(s) the at least one exhaust-tract-side sorption element, it is also not necessary for an additional heating element to be provided in the exhaust tract. In this way, the flow resistance and the exhaust-gas back pressure in the exhaust tract are not significantly increased, and the at least one exhaust-gas aftertreatment element is heated in a particularly effective manner taking into consideration the fuel consumption of the internal combustion engine.

In one specific embodiment, the exhaust-pipe internal wall and/or the at least one exhaust-gas aftertreatment element may be coated, at least in regions, with the vapour-sorbing material. In this way, the at least one sorption element can be of particularly simple form. Alternatively and/or in addition, the at least one exhaust-gas aftertreatment element may be produced at least in regions from the vapour-sorbing material. The effectiveness of the at least one sorption element can be further improved in this way. It would likewise also be conceivable for the exhaust-pipe internal wall to be produced at least in regions from the sorbing material.

In a further specific embodiment, the at least one exhaust-gas aftertreatment element may be formed by at least one catalytic converter and/or by at least one particle filter. The at least one catalytic converter and/or the at least one particle filter can be heated in a particularly simple manner by the vapour-sorbing material.

In one preferred embodiment, the content, in particular the mass content, of the vapour-sorbing material of the at least one sorption element arranged in particular in an inlet region of the exhaust tract may decrease in the exhaust-gas flow direction. In this way, it is possible for more vapour, in particular water vapour, to be sorbed from the exhaust-gas stream of the internal combustion engine with a defined amount of vapour-sorbing material in the at least one sorption element. It may preferably be provided that the content of the vapour-sorbing material of the at least one sorption element decreases in degressive fashion in the exhaust-gas flow direction.

Alternatively and/or in addition, the content, in particular the mass content, of the vapour-sorbing material of a sorption element arranged in an outlet region of the exhaust tract may increase in the exhaust-gas flow direction. It is ensured in this way that, when the internal combustion engine is at a standstill, no or only very little vapour, in particular water vapour, can pass into the exhaust tract as a result of a supply of air from the outside. The content of the vapour-sorbing material may preferably increase progressively in the exhaust-gas flow direction in order to increase the vapour absorption from the air in an effective manner.

In a further embodiment, the content, in particular the mass content, of the vapour-sorbing material in the exhaust tract, and thus considered across multiple sorption elements positioned in series in the exhaust-gas flow direction, in particular in an inlet region of the exhaust tract, may decrease in the exhaust-gas flow direction. In this way, a large amount of water vapour, for example, is sorbed close to the engine, and therefore, the exhaust-gas aftertreatment element positioned closest to the engine can be heated to the desired temperature very rapidly. As a result of the removal of a large amount of water vapour at the very beginning, it may then only be necessary to provide a relatively small amount of sorption material in the exhaust-gas aftertreatment elements situated downstream. The content of the vapour-sorbing material in the exhaust tract may preferably decrease, in this case for example degressively, in the exhaust-gas flow direction.

Alternatively and/or in addition, the content, in particular the mass content, of the vapour-sorbing material in an outlet region of the exhaust tract may increase in the exhaust-gas flow direction, such that when the internal combustion engine is at a standstill, no or only very little air moisture can pass into the exhaust tract as a result of a supply of air from the outside. Said content of the vapour-sorbing material may preferably increase progressively in the exhaust-gas flow direction.

In a further alternative embodiment, the content, in particular the mass content, of the vapour-sorbing material may be greater in an exhaust tract intermediate region arranged between an inlet and an outlet region of the exhaust tract than in an exhaust tract region situated upstream and/or downstream thereof. The exhaust tract intermediate region is preferably formed by an exhaust-gas aftertreatment element which has a greater content of sorption material than at least one exhaust-gas aftertreatment element situated upstream and/or at least one exhaust-gas aftertreatment element situated downstream. This may be expedient for example for applications in which a particularly temperature-critical region is not situated at the beginning or end of the exhaust tract.

In one preferred embodiment, the at least one sorption element may be arranged and/or formed in a main line, through which a main exhaust-gas stream passes, of the exhaust tract. In this way, a particularly large fraction of the vapour can be sorbed from the exhaust-gas stream by means of the at least one sorption element.

The sorbing material may specifically be a zeolite and/or a silica gel and/or an aluminophosphate and/or a silicoaluminophosphate and/or a metal hydride. These permit particularly effective sorption of the vapour. The zeolite may preferably be an A-, X- or Y-type zeolite. The zeolites that are used preferably furthermore do not exhibit an SCR action. In particular, the zeolites that are used are in the form of non-metal-exchanged zeolites, for example are in the form of iron or copper zeolites.

In a further embodiment, a blocking device may be provided that blocks or enables a supply of exhaust gas and/or air to a sorption region that accommodates and/or forms the at least one sorption element as a function of defined internal combustion engine operating conditions. The blocking device prevents a supply of exhaust gas and/or air, or of the vapour contained therein, to the at least one sorption element, preferably when the internal combustion engine is at a standstill.

The blocking device may preferably have at least one blocking element arranged downstream of the sorption region for the purpose of blocking or enabling the supply of air. In this way, the supply of air can be blocked and enabled in a simple manner. Alternatively and/or in addition, the blocking device may have at least one blocking element arranged upstream of the sorption region for the purpose of blocking or enabling the supply of exhaust gas. In this way, it is possible in turn for the supply of exhaust gas to the sorption region to be blocked and enabled in a simple manner.

The at least one blocking element arranged upstream may specifically be in the form of a shut-off valve by means of which an exhaust-gas stream through an inlet pipe that forms the inlet of the exhaust tract can be blocked or enabled. In this way, the blocking element is of particularly simple form.

Furthermore, the at least one blocking element arranged downstream may be in the form of a shut-off valve by means of which an air stream through an outlet pipe that forms the outlet of the exhaust tract can be blocked or enabled. Accordingly, the at least one blocking element arranged downstream is of particularly simple form. The at least one shut-off valve arranged downstream may preferably be in the form of an exhaust-gas recirculation flap or an engine braking flap, which then assist, by way of a dual function, in ensuring a reduction in the number of components.

The at least one blocking element arranged downstream may also be in the form of a sorption brick and arranged and/or accommodated in the exhaust tract. A supply of vapour into the sorption region by the air flowing into the exhaust tract is reliably prevented by means of said sorption brick. Here, the sorption brick may advantageously be produced from a vapour-sorbing material and/or may have a substrate body that is coated with a vapour-sorbing material.

In an inventive concept that is expressly also claimed independently of the above exhaust-gas aftertreatment device, there is also proposed a method for heating an exhaust-gas aftertreatment device for an internal combustion engine, having an exhaust tract with at least one exhaust pipe and at least one exhaust-gas aftertreatment element. According to the invention, an exhaust-pipe internal wall and/or the at least one exhaust-gas aftertreatment element have/has a vapour-sorbing material for the purpose of forming at least one exhaust-tract-side sorption element, wherein the supply of exhaust gas and/or air and thus the supply of vapour to the at least one sorption element is enabled upon a start of the internal combustion engine, in particular upon a cold start of the internal combustion engine, and wherein, upon a deactivation of the internal combustion engine, the supply of vapour to the at least one sorption element is blocked by a blocking device.

It is ensured in this way that the at least one sorption element is heated only upon a start of the internal combustion engine, in particular upon a cold start of the internal combustion engine. Upon a deactivation of the internal combustion engine, or when the latter is at a standstill, the supply of vapour to the at least one sorption element is blocked, because a continuous supply of vapour would lead to vapour saturation of the at least one sorption element.

The vapour that is sorbed by the at least one sorption element may preferably be expelled from the sorption element at a defined sorption element temperature. In this way, the at least one sorption element can be regenerated when the exhaust-gas aftertreatment device is heated. In this way, the sorption element exhibits its full functionality upon the next start of the internal combustion engine. Said defined sorption element temperature lies in a range from approximately 280° C. to 500° C. in the case of metal hydrides, in a range from approximately 40° C. to 100° C. in the case of silica gels, and in a range from approximately 130° C. to 300° C. in the case of zeolites. The vapour-sorbing material that is used preferably also has a theoretical heat capacity of approximately 250 kWh/K.

The advantageous embodiments and/or refinements of the invention explained above and/or rendered in the subclaims may—aside from in the cases, for example, of explicit dependencies or non-combinable alternatives—be used individually or in any desired combination with one another.

The invention and its advantageous embodiments and/or refinements and the advantages thereof will be explained in more detail below, merely by way of example, on the basis of drawings.

BRIEF DESCRIPTION OF THE DRAWINGS

In the drawings:

FIG. 1 is a diagrammatic illustration of an exhaust-gas aftertreatment device according to the invention, according to a first exemplary embodiment;

FIG. 2 shows a diagram illustrating the mass distribution of a vapour-sorbing material in the exhaust-gas aftertreatment device as per FIG. 1;

FIG. 3 shows a diagram illustrating the mass distribution of a vapour-sorbing material of exhaust-gas aftertreatment elements of the exhaust-gas aftertreatment device as per FIG. 1;

FIG. 4 is a diagrammatic illustration of an exhaust-gas aftertreatment device according to the invention as per a second exemplary embodiment;

FIG. 5 shows a diagram illustrating the mass distribution of a vapour-sorbing material in the exhaust-gas aftertreatment device as per a third exemplary embodiment;

FIG. 6 shows a diagram illustrating the mass distribution of a vapour-sorbing material of exhaust-gas aftertreatment elements of the exhaust-gas aftertreatment device as per FIG. 5.

DETAILED DESCRIPTION OF THE PREFERRED EMBODIMENTS

Figure 7:
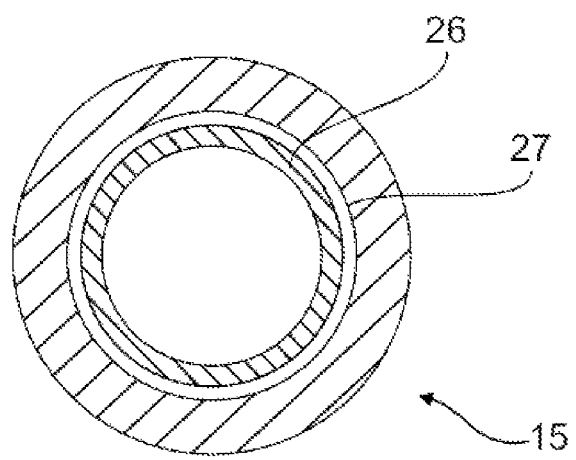
FIG. 7 is a sectional illustration along the section plane A-A from FIG. 1.

FIG. 1 shows an exhaust tract 1 according to the invention in a first embodiment. Said exhaust tract 1 has an inlet pipe 3 which is connected by way of a first end region to an internal combustion engine 5 and by way of a second end region to a particle filter housing or can 9 that accommodates a particle filter 7. The particle filter pipe 9 is adjoined, in the exhaust-gas flow direction S, by a connecting pipe 15 that is coupled to the particle filter pipe 9 and to a catalytic converter housing or can 13 that accommodates a catalytic converter 11. The exhaust tract 1 also comprises an outlet pipe 17 which is connected by way of a first end region to the catalytic converter pipe 13 and which issues, by way of a second end region, into the environment.

The particle filter 7, the catalytic converter 11 and internal walls of the particle filter housing 9, of the catalytic converter housing 13 and of the connecting pipe 15 are coated with a vapour-sorbing material. This emerges for example from the section through the connecting pipe 15 shown in FIG. 7. Accordingly, a layer 26 of sorbing material is applied, with a defined layer thickness, to an internal wall 27 of the connecting pipe 15. The vapour-sorbing material may for example be a type-A zeolite, to name just one of the possible embodiments of said material. By virtue of said material sorbing vapour from the exhaust gas of the internal combustion engine 5 or from the surrounding air, said vapour condenses, and heat energy is released. In this way, the entire exhaust tract 1 is warmed up more rapidly in the cold-start phase of the internal combustion engine 5, whereby the particle filter 7 and the catalytic converter 11 can reach their optimum working temperature more quickly.

FIGS. 2 and 3 illustrate the mass distribution of the vapour-sorbing material in the exhaust tract 1. To illustrate this, in FIG. 2, the catalytic converter 11, the particle filter 7 and further exhaust-gas aftertreatment elements that can be integrated into the exhaust tract 1 are combined to form an exhaust-gas aftertreatment system 18. Furthermore, the pipes arranged between the inlet pipe 5 and the outlet pipe 17 have also been combined into a single accommodating pipe 25 that accommodates the exhaust-gas aftertreatment system 18. As per FIG. 2, a mass content m of the vapour-sorbing material in the exhaust-gas aftertreatment system 18 decreases degressively over the length $l_{AS}$ of the latter in the exhaust-gas flow direction S. Said mass distribution permits faster heating of the particle filter 7 arranged in the region of the internal combustion engine 5.

By contrast to FIG. 2, it is the case in FIG. 3 that the exhaust-gas aftertreatment system 18 has again been broken down into individual exhaust-gas aftertreatment elements 19 in order to illustrate the mass distribution in the exhaust-gas aftertreatment elements 19. As per FIG. 3, a mass content m of the vapour-sorbing material in the individual exhaust-gas aftertreatment elements 19 decreases degressively over the length $l_{AE}$ of the respective exhaust-gas aftertreatment element in the exhaust-gas flow direction S. By means of said mass distribution, it is possible for more vapour to be sorbed from the exhaust-gas stream of the internal combustion engine 5 with a defined amount of vapour-sorbing material in each exhaust-gas aftertreatment element 19, because the vapour quantity in the exhaust gas decreases owing to the fact that the exhaust-gas temperature decreases in the exhaust-gas flow direction S.

It also emerges from FIG. 1 that the inlet pipe 3 has an inlet valve 20. By means of said inlet valve, an exhaust-gas stream through the inlet pipe 3 can be blocked or enabled as a function of defined internal combustion engine operating conditions. Furthermore, the outlet pipe 17 has an outlet valve 21 by means of which an air flow into the exhaust tract 1 from the outside can likewise be blocked or enabled as a function of defined internal combustion engine operating conditions.

The individual method steps for fast heating of the exhaust tract 1 according to the invention will now be explained below:

Upon a cold start of the internal combustion engine 5, or shortly before that, the inlet valve 20 and the outlet valve 21 are opened such that the exhaust gas of the internal combustion engine 5 can flow through the exhaust tract 1 into the environment. The vapour, for example water vapour, contained in the exhaust gas is taken in by the vapour-sorbing material, and, aside from the heat energy of the exhaust gas, additional heat energy is released. Said additional heat energy permits particularly rapid heating of the exhaust tract 1. After the cold-start phase has taken place, the vapour-sorbing material is heated by means of the exhaust gas such that the vapour stored therein is expelled again and can flow out of the exhaust tract 1 into the environment. Upon a deactivation of the internal combustion engine 5, or shortly thereafter, the inlet valve 20 and the outlet valve 21 are closed again in order to prevent a further supply of vapour to the vapour-sorbing material. In this way, saturation of the vapour-sorbing material before another cold start of the internal combustion engine 5 is reliably prevented.

FIG. 4 shows the exhaust tract 1 according to the invention as per a second exemplary embodiment. Here, the exhaust tract 1 does not have an outlet valve 21 for blocking and enabling the supply of air, and instead has a sorption brick 23 which is arranged in the accommodating pipe 25 and which follows the exhaust-gas aftertreatment system 18 as viewed in the exhaust-gas flow direction S. Said sorption brick 23 is a body which is produced from a vapour-sorbing material and which is of for example cylindrical or block-shaped form and which reliably prevents the supply of vapour into the exhaust-gas aftertreatment system 18 from the ambient air when the internal combustion engine 5 is at a standstill.

FIGS. 5 and 6 show the exhaust tract 1 according to the invention as per a third exemplary embodiment. Here, again, the exhaust tract 1 does not have an outlet valve 21 for blocking and enabling the supply of air. To nevertheless prevent the supply of vapour from the ambient air to at least some of the exhaust-gas aftertreatment elements 19, it is provided here that the mass content m of the vapour-sorbing material increases progressively in the exhaust-gas flow direction S in that exhaust-gas aftertreatment element which directly adjoins the outlet pipe 17.

LIST OF REFERENCE SIGNS

1 Exhaust tract
3 Inlet pipe
5 Internal combustion engine
7 Particle filter
9 Particle filter housing
11 Catalytic converter
13 Catalytic converter housing
15 Connecting pipe
17 Outlet pipe
18 Exhaust-gas aftertreatment system
19 Exhaust-gas aftertreatment element
20 Inlet valve
21 Outlet valve
23 Sorption brick
25 Accommodating pipe
26 Layer of vapour-sorbing material
27 Internal wall of connecting pipe
S Exhaust-gas flow direction

The invention claimed is:

1. An exhaust-gas aftertreatment device for an internal combustion engine including an exhaust tract, wherein the exhaust tract comprises:
   an exhaust pipe having an internal wall;
   at least one exhaust-gas aftertreatment element;
   an exhaust-tract-side sorption element including a vapour-sorbing material disposed on at least one of the internal wall of the exhaust pipe and the at least one exhaust-gas aftertreatment element; and
   a blocking device including a downstream blocking element that blocks a supply of vapour from ambient air to a sorption region that accommodates or forms the at least one sorption element as a function of internal combustion engine operating conditions, the downstream blocking device arranged downstream of the sorption region.

2. The exhaust-gas aftertreatment device according to claim 1, wherein the at least one exhaust-tract-side sorption element comprises at least one of:
   a coating of the vapour-sorbing material on the at least one of the internal wall of the exhaust pipe and the at least one exhaust-gas aftertreatment element; and
   portions of the at least one exhaust-gas aftertreatment element produced at least in regions from the vapour-sorbing material.

3. The exhaust-gas aftertreatment device according to claim 1, wherein the at least one exhaust-gas aftertreatment element is at least one of a catalytic converter and a particle filter.

4. The exhaust-gas aftertreatment device according to claim 1, wherein a mass content of the vapour-sorbing material of the at least one sorption element decreases in an exhaust-gas flow direction.

5. The exhaust-gas aftertreatment device according to claim 1, wherein a mass content of the vapour-sorbing material of the at least one sorption element arranged in an outlet region of the exhaust tract increases in an exhaust-gas flow direction.

6. The exhaust-gas aftertreatment device according to claim 1, wherein the at least one sorption element includes a first sorption element arranged in an inlet region of the exhaust tract and a second sorption element arranged in an outlet region of the exhaust tract,
   a mass content of the vapour-sorbing material of the first sorption element decreases in an exhaust-gas flow direction; and
   the mass content of the vapour-sorbing material of the second sorption element increases in the exhaust-gas flow direction.

7. The exhaust-gas aftertreatment device according to claim 1, wherein the at least one sorption element includes a plurality of sorption elements, and at least one of:
   a mass content of the vapour-sorbing material in the exhaust tract considered across the plurality of sorption elements positioned in series in the flow direction in an inlet region of the exhaust tract decreases in the exhaust-gas flow direction; and
   the mass content of the vapour-sorbing material in an outlet region of the exhaust tract increases in the exhaust-gas flow direction.

8. The exhaust-gas aftertreatment device according to claim 1, wherein a mass content of the vapour-sorbing material is greater in an intermediate region of the exhaust tract arranged between an inlet and an outlet region of the exhaust tract than in an exhaust tract region situated upstream and/or downstream thereof.

9. The exhaust-gas aftertreatment device according to claim 1, wherein the at least one sorption element is disposed in a main line of the exhaust tract, through which a main exhaust-gas stream passes.

10. The exhaust-gas aftertreatment device according to claim 1, wherein the vapour-sorbing material is at least one of a zeolite, a silica gel, an aluminophosphate, a silicoaluminophosphate, and a metal hydride.

11. The exhaust-gas aftertreatment device according to claim 1, wherein the blocking device further comprises an upstream blocking element arranged upstream of the sorption region for the purpose of blocking or enabling the supply of exhaust gas.

12. The exhaust-gas aftertreatment device according to claim 11, wherein the upstream blocking element is a shut-off valve that blocks or enables an exhaust-gas stream through an inlet pipe that forms an inlet of the exhaust tract.

13. The exhaust-gas aftertreatment device according to claim 1, wherein the downstream blocking element is a shut-off valve that blocks or enables an air stream through an outlet pipe that forms an outlet of the exhaust tract.

14. The exhaust-gas aftertreatment device according to claim 13, wherein the shut-off valve is an exhaust-gas recirculation flap or an engine braking flap.

15. The exhaust-gas aftertreatment device according to claim 1, wherein the downstream blocking element is a sorption brick disposed in the exhaust tract.

16. A method for heating an exhaust-gas aftertreatment device for an internal combustion engine having an exhaust tract, wherein the exhaust tract comprises an exhaust pipe having an internal wall, at least one exhaust-gas aftertreatment element, and an exhaust-tract-side sorption element including a vapour-sorbing material disposed on at least one of the internal wall of the exhaust pipe and the at least one exhaust-gas aftertreatment element, the method comprising:
   heating the exhaust-gas aftertreatment device by enabling a supply of vapour to the at least one sorption element upon a start of the internal combustion engine by a supply of exhaust gas or air; and
   blocking, upon a deactivation of the internal combustion engine, the supply of vapour to the at least one sorption element by a blocking device.

17. The method according to claim 16, further comprising expelling the vapour that is sorbed by the at least one sorption element from the sorption element above a defined sorption element temperature.

18. An exhaust-gas aftertreatment device for an internal combustion engine including an exhaust tract, wherein the exhaust tract comprises:
   an exhaust pipe having an internal wall;
   at least one exhaust-gas aftertreatment element; and
   an exhaust-tract-side sorption element including a vapour-sorbing material disposed on at least one of the internal wall of the exhaust pipe and the at least one exhaust-gas aftertreatment element, wherein a mass content of the vapour-sorbing material of the at least one sorption element decreases in an exhaust-gas flow direction.

19. An exhaust-gas aftertreatment device for an internal combustion engine including an exhaust tract, wherein the exhaust tract comprises:
   an exhaust pipe having an internal wall;
   at least one exhaust-gas aftertreatment element; and
   an exhaust-tract-side sorption element including a vapour-sorbing material disposed on at least one of the internal wall of the exhaust pipe and the at least one exhaust-gas aftertreatment element, wherein a mass content of the vapour-sorbing material of the at least one sorption element arranged in an outlet region of the exhaust tract increases in an exhaust-gas flow direction.

20. An exhaust-gas aftertreatment device for an internal combustion engine including an exhaust tract, wherein the exhaust tract comprises:
   an exhaust pipe having an internal wall;
   at least one exhaust-gas aftertreatment element; and
   an exhaust-tract-side sorption element including a vapour-sorbing material disposed on at least one of the internal wall of the exhaust pipe and the at least one exhaust-gas aftertreatment element, wherein the at least one sorption element includes a first sorption element arranged in an inlet region of the exhaust tract and a second sorption element arranged in an outlet region of the exhaust tract,
   a mass content of the vapour-sorbing material of the first sorption element decreases in an exhaust-gas flow direction; and
   the mass content of the vapour-sorbing material of the second sorption element increases in the exhaust-gas flow direction.

21. An exhaust-gas aftertreatment device for an internal combustion engine including an exhaust tract, wherein the exhaust tract comprises:
   an exhaust pipe having an internal wall;
   at least one exhaust-gas aftertreatment element; and
   an exhaust-tract-side sorption element including a vapour-sorbing material disposed on at least one of the internal wall of the exhaust pipe and the at least one exhaust-gas aftertreatment element, wherein the at least one sorption element includes a plurality of sorption elements, and at least one of:
   a mass content of the vapour-sorbing material in the exhaust tract considered across the plurality of sorption elements positioned in series in the flow direction in an inlet region of the exhaust tract decreases in the exhaust-gas flow direction; and
   the mass content of the vapour-sorbing material in an outlet region of the exhaust tract increases in the exhaust-gas flow direction.

22. An exhaust-gas aftertreatment device for an internal combustion engine including an exhaust tract, wherein the exhaust tract comprises:
   an exhaust pipe having an internal wall;
   at least one exhaust-gas aftertreatment element; and
   an exhaust-tract-side sorption element including a vapour-sorbing material disposed on at least one of the internal wall of the exhaust pipe and the at least one exhaust-gas aftertreatment element, wherein a mass content of the vapour-sorbing material is greater in an intermediate region of the exhaust tract arranged between an inlet and an outlet region of the exhaust tract than in an exhaust tract region situated upstream and/or downstream thereof.

* * * * *